United States Patent
Kim et al.

(10) Patent No.: US 10,969,828 B2
(45) Date of Patent: *Apr. 6, 2021

(54) DISPLAY APPARATUS

(71) Applicant: SAMSUNG DISPLAY CO., LTD., Yongin-Si (KR)

(72) Inventors: Kyungseop Kim, Hwaseong-si (KR); Sungkyun Park, Hwaseong-si (KR); Jinbo Shim, Yongin-si (KR); Jaewon Choi, Hwaseong-si (KR); Jung-moo Hong, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/913,295

(22) Filed: Jun. 26, 2020

(65) Prior Publication Data

US 2020/0326750 A1    Oct. 15, 2020

Related U.S. Application Data

(63) Continuation of application No. 16/384,042, filed on Apr. 15, 2019, now Pat. No. 10,698,446.

(30) Foreign Application Priority Data

Jun. 12, 2018    (KR) ........................ 10-2018-0067310

(51) Int. Cl.
     *G06F 1/16*        (2006.01)
     *G06F 3/0488*     (2013.01)

(52) U.S. Cl.
     CPC .......... *G06F 1/1641* (2013.01); *G06F 1/1616* (2013.01); *G06F 1/1643* (2013.01); *G06F 3/04886* (2013.01)

(58) Field of Classification Search
CPC .. G06F 3/04886; G06F 1/1641; G06F 1/1616; G06F 1/1652; G06F 1/1643
See application file for complete search history.

(56) References Cited

U.S. PATENT DOCUMENTS 9,119,316 B2    8/2015   Lee
9,980,373 B2    5/2018   Jeong et al.
(Continued)

FOREIGN PATENT DOCUMENTS

KR    10-2014-0014669 A    2/2014
KR    10-2016-0120399 A    10/2016
(Continued)

*Primary Examiner* — Muhammad N Edun
(74) *Attorney, Agent, or Firm* — Lewis Roca Rothgerber Christie LLP

(57) ABSTRACT

A display apparatus includes: a display module in which a folding area foldable with respect to a virtual folding axis on a plane and first and second non-folding areas adjacent to both sides of the folding area are defined and which is configured to display an image; a support plate below the display module; and an adhesion film between the display module and the support plate. The support plate includes a first support plate bonded to the adhesion film on the first non-folding area, and a second support plate bonded to the adhesion film on the second non-folding area. The first support plate includes a plurality of first protrusions protruding toward the second support plate, the second support plate includes a plurality of second protrusions protruding toward the first support plate, and the first and second protrusions are alternately arranged with respect to each other.

12 Claims, 16 Drawing Sheets

(56) References Cited

U.S. PATENT DOCUMENTS

| | | | |
|---|---|---|---|
| 2010/0041439 A1* | 2/2010 | Bullister | G06F 1/1666 455/566 |
| 2017/0061836 A1 | 3/2017 | Kim et al. | |
| 2018/0070460 A1 | 3/2018 | Han | |
| 2018/0150108 A1 | 5/2018 | Song | |
| 2018/0192527 A1 | 7/2018 | Yun et al. | |

FOREIGN PATENT DOCUMENTS

| | | |
|---|---|---|
| KR | 10-2017-0061804 A | 6/2017 |
| KR | 10-2017-0070917 A | 6/2017 |
| KR | 10-2018-0026598 A | 2/2018 |
| KR | 10-2018-0036323 A | 4/2018 |

* cited by examiner

DISPLAY APPARATUS

CROSS-REFERENCE TO RELATED APPLICATIONS

This application is a continuation of U.S. patent application Ser. No. 16/384,042, filed on Apr. 15, 2019, which claims priority to and the benefit of Korean Patent Application No. 10-2018-0067310, filed on Jun. 12, 2018 in the Korean Intellectual Property Office, the entire content of each of which is hereby incorporated by reference.

BACKGROUND

1. Field

Aspects of embodiments of the present disclosure relate to a display apparatus.

2. Description of Related Art

A display apparatus displays various images on a display screen to provide information to a user. In recent years, a display apparatus including a flexible display panel to be foldable and rollable is being developed. The flexible display apparatus may be foldable or rollable like a paper, unlike a flat panel display apparatus. The flexible display apparatus that is variously changeable in shape may be easily carried and improve convenience to a user.

SUMMARY

According to an aspect of embodiments of the present disclosure, a display apparatus has improved durability and display quality.

According to one or more embodiments of the inventive concept, a display apparatus includes: a display module in which a folding area foldable with respect to a virtual folding axis on a plane and a plurality of non-folding areas adjacent to both sides of the folding area are defined and which is configured to display an image; a support plate having a plate shape and arranged below the display module; and an adhesion film between the display module and the support plate.

The support plate may include: a first support plate bonded to the adhesion film on a first non-folding area of the plurality of non-folding areas, which is adjacent to one of the sides of the folding area; and a second support plate spaced apart from the first support plate and bonded to the adhesion film on a second non-folding area of the plurality of non-folding areas, which is adjacent to the other side of the folding area.

In one or more embodiments, the first support plate may include a plurality of first protrusions protruding toward the second support plate, the second support plate may include a plurality of second protrusions protruding toward the first support plate, and the first and second protrusions may be alternately arranged with respect to each other.

In one or more embodiments, a first side surface of the first support plate may face a second side surface of the second support plate, the plurality of first protrusions may protrude from the first side surface toward the second side surface, and the plurality of second protrusions may protrude from the second side surface toward the first side surface.

In one or more embodiments, in a non-folded state of the display module, the first and second protrusions may overlap the folding area to support the folding area of the display module.

In one or more embodiments, in the non-folded state of the display module, the first and second protrusions may protrude in a sawtooth shape and may be arranged to be engaged with each other.

In one or more embodiments, in a folded state of the display module, the first and second protrusions may be spaced apart from the folding area of the display module.

In one or more embodiments, the adhesion film may include: a first adhesion film configured to fix the first support plate to the first non-folding area; and a second adhesion film configured to fix the second support plate to the second non-folding area.

In one or more embodiments, the display apparatus may further include: a first stepped layer between the first protrusions and the first adhesion film of the display module; and a second stepped layer between the second protrusions and the second adhesion film of the display module.

In one or more embodiments, the first and second stepped layers may be fixed to the first and second support plates, respectively.

In one or more embodiments, the first and second stepped layers may be on top surfaces of the first and second support plates to cover the first and second protrusions, respectively.

In one or more embodiments, in a non-folded state of the display module, the first and second stepped layers may support the folding area.

In one or more embodiments, in a folded state of the display module, the first and second stepped layers may be spaced apart from the folding area of the display module.

In one or more embodiments, the support plate may have rigidity greater than that of the display module.

In one or more embodiments, each of the first and second protrusions may have a triangular shape when viewed in a plane.

In one or more embodiments, each of the first and second protrusions may have a rectangular shape when viewed in a plane.

In one or more embodiments, the adhesion film may have an integrated shape.

In one or more embodiments, the display apparatus may further include a non-adhesion film between the adhesion film and the support plate on the folding area.

In one or more embodiments, the non-adhesion film may include fluorine or titanium.

In one or more embodiments, the non-adhesion film may include: a first non-adhesion film between the first support plate and the adhesion film on the folding area; and a second non-adhesion film between the second support plate and the adhesion film on the folding area.

In one or more embodiments, the first and second non-adhesion films may be fixed to the first and second support plates, respectively.

In one or more embodiments, the first and second non-adhesion films may be on top surfaces of the first and second support plates to cover the first and second protrusions, respectively.

BRIEF DESCRIPTION OF THE DRAWINGS

The accompanying drawings are included to provide a further understanding of the inventive concept, and are incorporated in and constitute a part of this specification. The drawings illustrate some exemplary embodiments of the inventive concept and, together with the description, serve to explain principles of the inventive concept. In the drawings.

DETAILED DESCRIPTION

Figure 1:
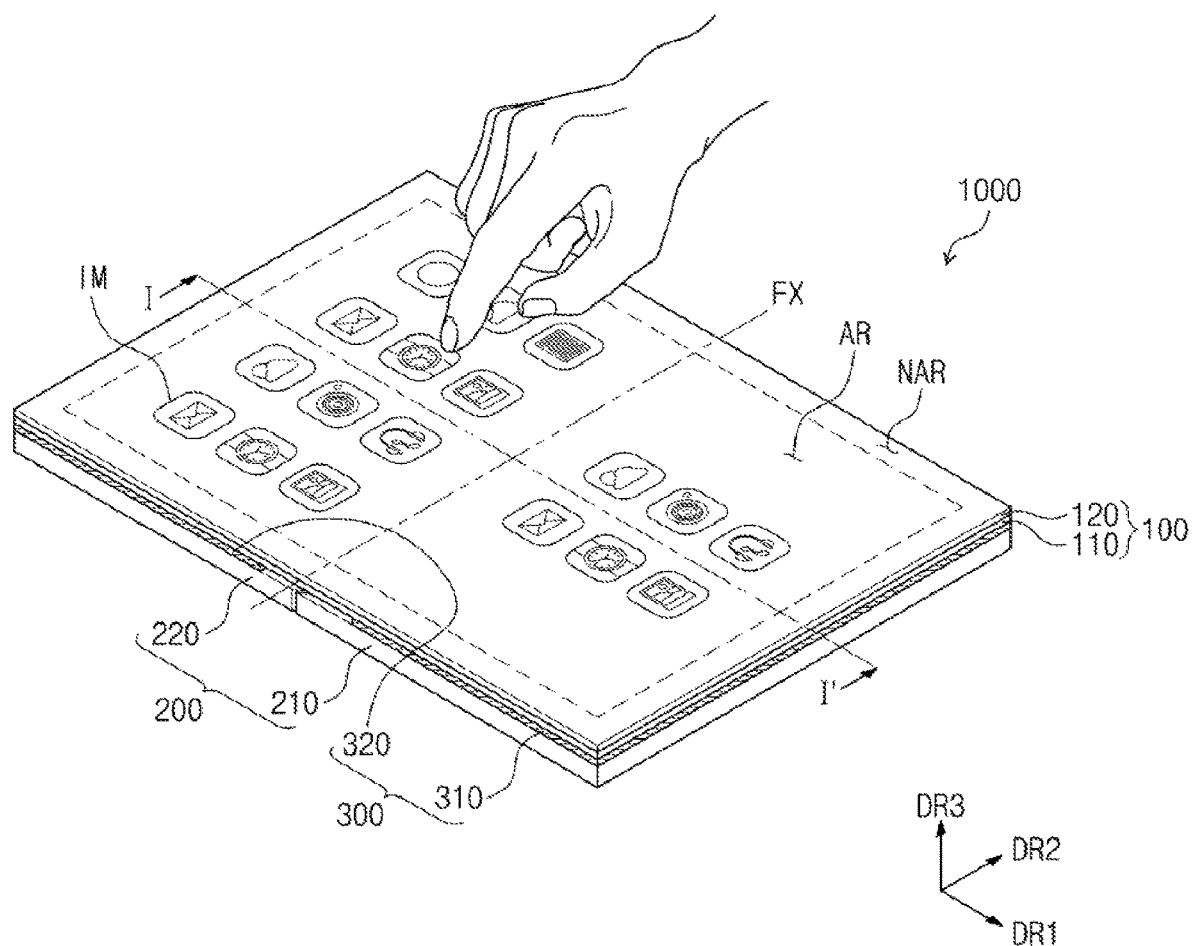
FIG. 1 is a perspective view of a display apparatus according to an embodiment of the inventive concept.

Aspects and features of the present invention, and implementation methods thereof will be clarified through some embodiments described herein with reference to the accompanying drawings. The present disclosure may, however, be embodied in different forms and should not be construed as limited to the embodiments set forth herein. Rather, these embodiments are provided such that this disclosure will be thorough and complete, and will fully convey the scope of the inventive concept to those skilled in the art. Like reference numerals refer to like elements throughout.

It is to be understood that when a layer is referred to as being "on" another layer or substrate, it can be directly on the other layer or substrate, or one or more intervening layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below," "beneath," "lower," "above," "upper," and the like, may be used herein for ease of description to describe one element or feature's relationship to another element(s) or feature(s) as illustrated in the figures. The spatially relative terms should be understood as terms which include different directions of configurative elements in addition to directions illustrated in the figures when using or operating the inventive concept.

It is to be understood that although the terms of "first" and "second" may be used herein to describe various elements and/or sections, these elements and/or sections should not be limited by these terms. These terms are used to distinguish one element, component, or section from another element, component, or section. Accordingly, a "first" element, a "first" component, or a "first" section may be a second element, a second component, or a second section within the technical idea of the present disclosure.

The embodiments in the following description may be described with schematic cross-sectional views and/or plan views as exemplary views of the inventive concept. Accordingly, shapes of the exemplary views may be modified according to manufacturing techniques and/or allowable errors. Therefore, the embodiments of the inventive concept are not limited to the specific shapes illustrated in the exemplary views, but may include other shapes that may be created according to manufacturing processes. Areas exemplified in the drawings may have general properties. Thus, this should not be construed as limited to the scope of the inventive concept.

Herein, some exemplary embodiments of the inventive concept will be described below in further detail with reference to the accompanying drawings.

Figure 2:
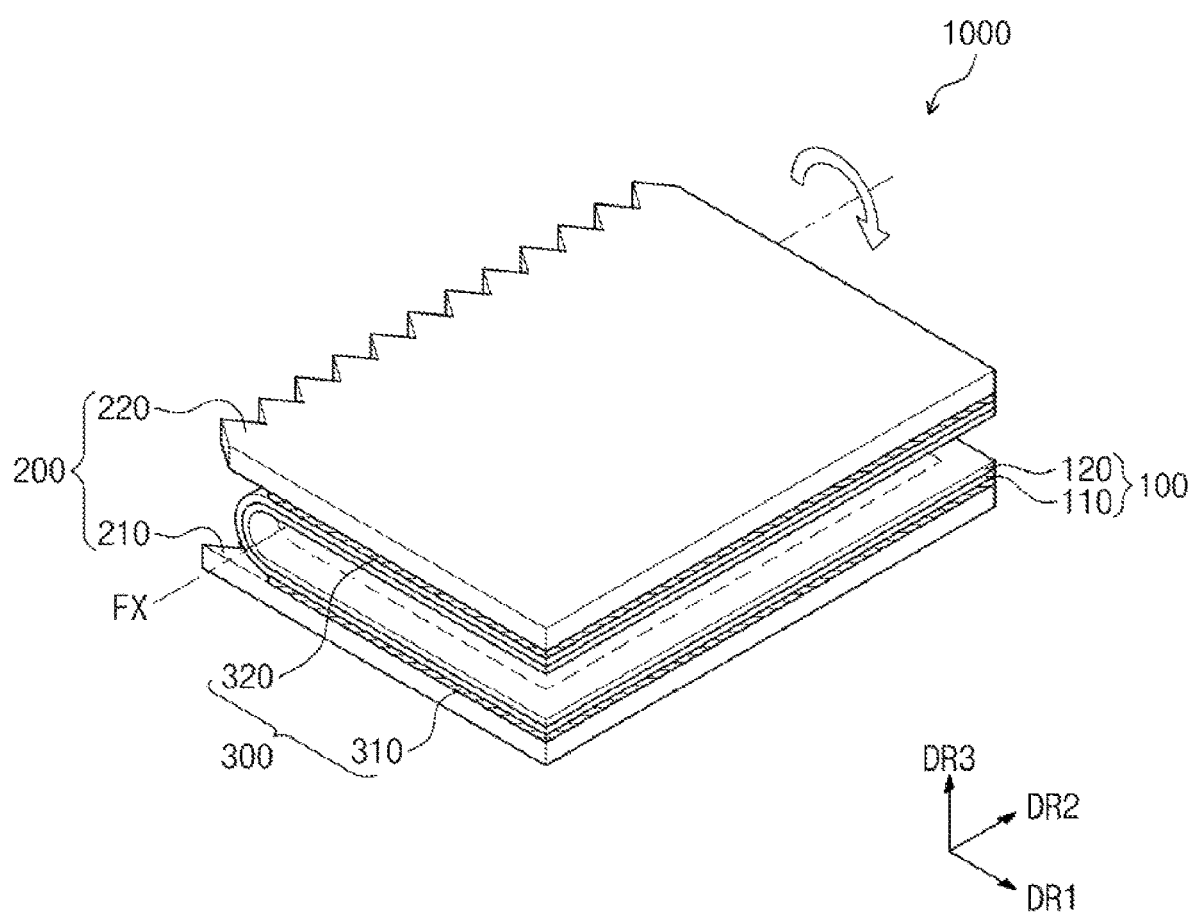
FIG. 2 is a view illustrating a state in which the display apparatus of FIG. 1 is in-folded.
Figure 3:
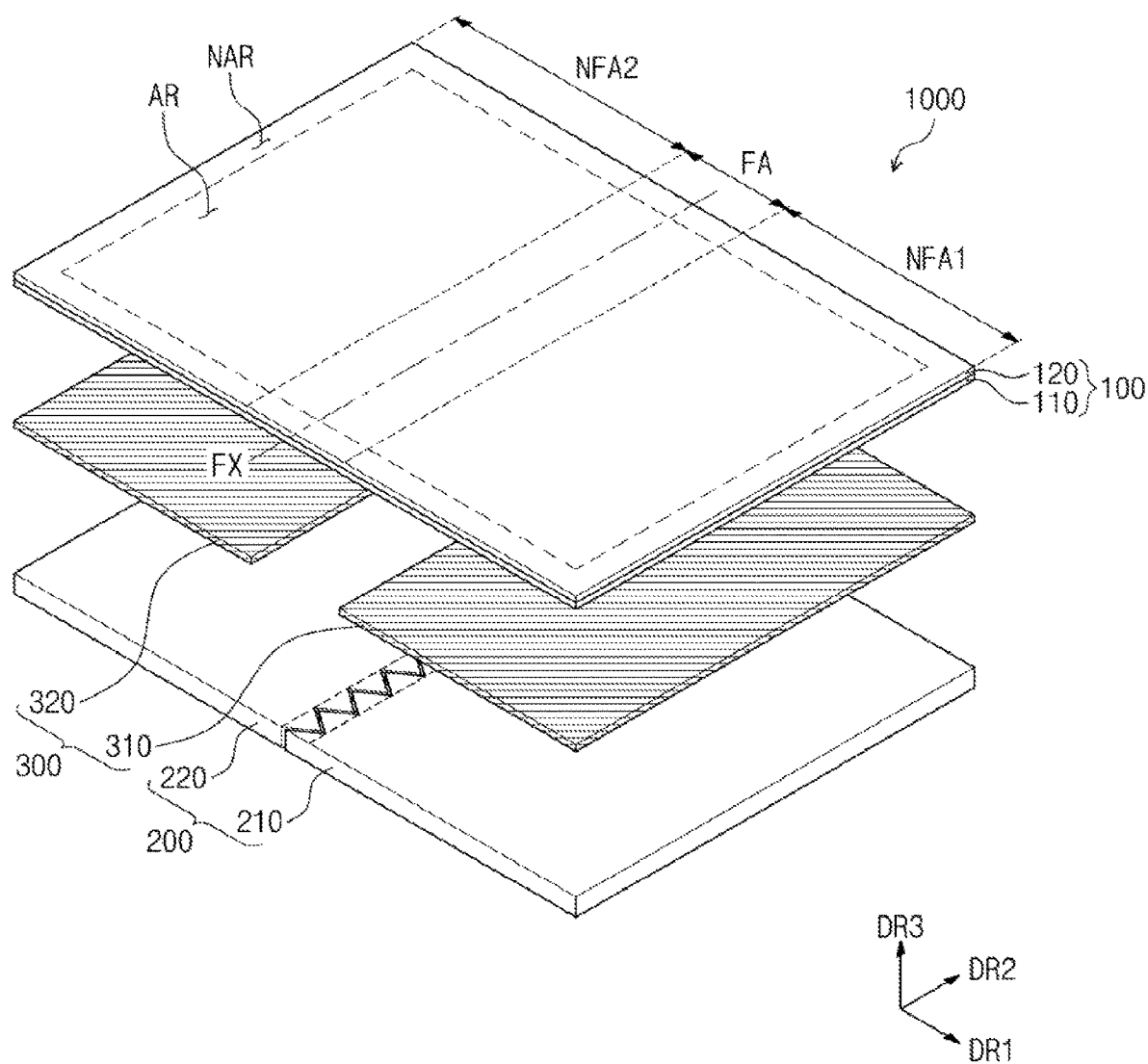
FIG. 3 is an exploded perspective view of the display apparatus of FIG. 1.

FIG. 1 is a perspective view of a display apparatus according to an embodiment of the inventive concept; FIG. 2 is a view illustrating a state in which the display apparatus of FIG. 1 is in-folded; and FIG. 3 is an exploded perspective view of the display apparatus of FIG. 1.

Referring to FIGS. 1 and 2, a display apparatus 1000 according to an embodiment of the inventive concept has a rectangular shape with a long side in a first direction DR1 and a short side in a second direction DR2 crossing the first direction DR1. However, the display apparatus 1000 according to other embodiments of the inventive concept is not limited to the above-described shape and, thus, may have any of various shapes.

The display apparatus 1000 may be a flexible display apparatus.

Particularly, the display apparatus 1000 according to an embodiment of the inventive concept may be folded or unfolded with respect to a folding axis FX extending in a direction (e.g., a predetermined direction). Herein, a folded state with respect to the folding axis FX may be defined as a folded state, and an unfolded state may be defined as a non-folded state. The display apparatus 1000 may be a folding-type (foldable) display apparatus 1000. In an embodiment of the inventive concept, the folding axis FX may extend in the second direction DR2.

The display apparatus 1000 may be divided into a plurality of areas according to the folded state. The display apparatus 1000 may be divided into a folding area FA and at least one non-folding area NFA1 and NFA2, which are arranged on the plane. The folding area FA may be an area to which folding stress due to a folding operation is applied. The folding area FA may overlap the folding axis FX on the plane.

According to an embodiment, the folding area FA of the display apparatus 1000 is defined between the two non-folding areas NFA1 and NFA2. Herein, the non-folding areas NFA1 and NFA2 refer to a first non-folding area NFA1 and a second non-folding area NFA2. The first non-folding area NFA1 may be adjacent to one side of the folding area FA in the first direction DR1, and the second non-folding area NFA2 may be adjacent to the other side of the folding area FA in the first direction DR1.

The folding area FA, the first non-folding area NFA1, and the second non-folding area NFA2 may be defined on the planes of members constituting the display apparatus 1000.

Although, in the present exemplary embodiment, one folding area FA is defined on the display apparatus 1000, the inventive concept is not limited thereto. According to other embodiments of the inventive concept, a plurality of folding areas may be defined on the display apparatus 1000.

The display apparatus 1000 according to an embodiment of the inventive concept may be in-folded. Here, the in-folding refers to a state in which a top surface of the display apparatus 1000, which is defined as the display surface on which an image IM is displayed, is folded such that regions thereof face each other.

The display apparatus 1000 includes a display module 100, a support plate 200, and an adhesion film 300.

As illustrated in FIG. 1, the display module 100 may be divided into an active area AR and a peripheral area NAR on the plane defined by the first direction DR1 and the second direction DR2. In an embodiment, the active area AR is defined at a central portion of the display module 100 on the plane. The peripheral area NAR is adjacent to the active area AR. In an embodiment, the peripheral area NAR may surround the active area AR. In the present exemplary embodiment, the peripheral area NAR is defined in a frame shape surrounding the active area AR.

However, embodiments of the inventive concept are not limited to the shapes and number of the active area AR and the peripheral area NAR. The display module 100 according to another embodiment of the inventive concept may include only the active area AR. In an embodiment, the active area AR may be provided in plural, and the plurality of active areas AR may be spaced apart from each other.

In an embodiment, the display module 100 includes a display panel 110 and an input detection unit 120.

The display panel 110 may be a base layer on which the input detection unit 120 is disposed. For example, the display panel 110 may be one insulation substrate or one insulation film. The display panel 110 displays an image IM (see FIG. 1) in the active area AR.

The support plate 200 may be disposed below the display module 100 to support the display module 100. The support plate 200 may have a plate shape. The support plate 200 may have rigidity greater than that of the display module 100. In an embodiment, for example, the support plate 200 may include a metal material. However, embodiments of the inventive concept are not particularly limited to the material of the support plate 200.

The support plate 200 includes a first support plate 210 and a second support plate 220. The first support plate 210 is disposed on one side in the first direction DR1. The first support plate 210 overlaps a portion of the folding area FA and the first non-folding area NFA1. The second support plate 220 is disposed on the other side in the first direction DR1. The second support plate 220 overlaps another portion (e.g., a residual portion) of the folding area FA and the second non-folding area NFA2. The first support plate 210 and the second support plate 220 may be disposed to be spaced apart from each other in the first direction DR1.

The adhesion film 300 is disposed between the display module 100 and the support plate 200. The adhesion film 300 bonds the display module 100 and the support plate 200 to each other on the first and second non-folding areas NFA1 and NFA2. The adhesion film 300 according to an embodiment of the inventive concept may include a thermosetting resin or a photocurable resin.

The adhesion film 300 includes a first adhesion film 310 and a second adhesion film 320. The first adhesion film 310 is disposed on one side in the first direction DR1 and also disposed between the first support plate 210 and the first non-folding area NFA1 of the display module 100. The second adhesion film 320 is disposed on the other side in the first direction DR1 and also disposed between the second support plate 220 and the second non-folding area NFA2 of the display module 100. The first adhesion film 310 and the second adhesion film 320 may be disposed to be spaced a distance corresponding to the folding area FA from each other in the first direction DR1.

Figure 4:
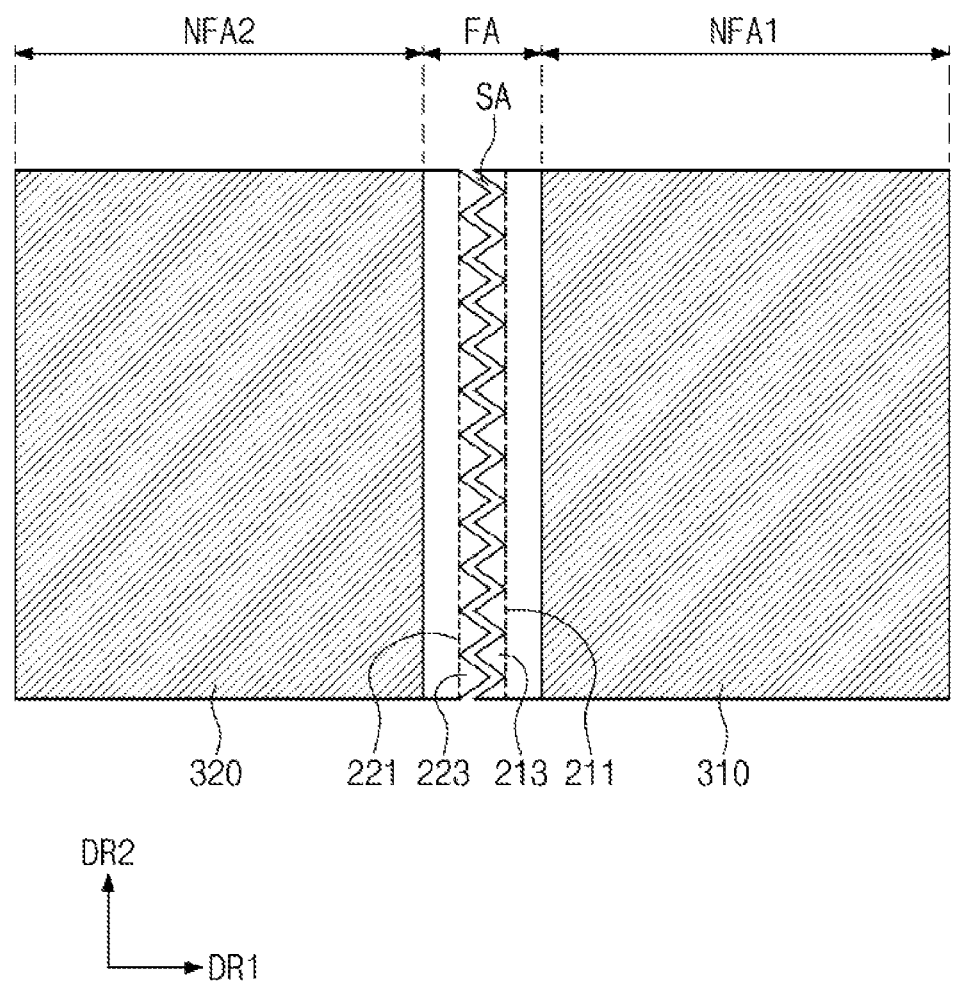
FIG. 4 is a plan view illustrating shapes of first and second support plates of FIG. 3.

FIG. 4 is a plan view illustrating shapes of the first and second support plates of FIG. 3.

Referring to FIGS. 2 to 4, each of the first support plate 210 and the second support plate 220 may have a generally rectangular plate shape. Also, each of the first support plate 210 and the second support plate 220 may have a side surface, the side surfaces of the first and second support plates 210 and 220 may face each other in the first direction DR1.

In an embodiment, the first support plate 210 includes a plurality of first protrusions 213 protruding toward the second support plate 220, and the second support plate 220 includes a plurality of second protrusions 223 protruding toward the first support plate 210. A first side surface 211 of the first support plate 210 may face a second side surface 221 of the second support plate 220. The first protrusions 213 protrude from the first side surface 211 toward the second side surface 221, and the second protrusions 223 protrude from the second side surface 221 toward the first side surface 211.

In the non-folded state of the display apparatus 1000, the first and second protrusions 213 and 223 overlap the folding area FA to support the folding area FA of the display module 100. In the folded state of the display module 100, the first and second protrusions 213 and 223 may be spaced apart from the folding area FA of the display module 100. In the folded state of the display module 100, the first and second protrusions 213 and 223 may be disposed to face each other.

In the non-folded state of the display apparatus 1000, the first and second protrusions 213 and 223 may be alternately disposed in the second direction DR2. According to an embodiment of the inventive concept, the first and second protrusions 213 and 223 may protrude in a triangular shape and thus be disposed to be engaged with each other. In an embodiment, each of the first and second protrusions 213 and 223 may have an equilateral triangular shape, for example, a square shape, or an isosceles triangular shape when viewed in the plane, but the inventive concept is not limited thereto.

Figure 5:
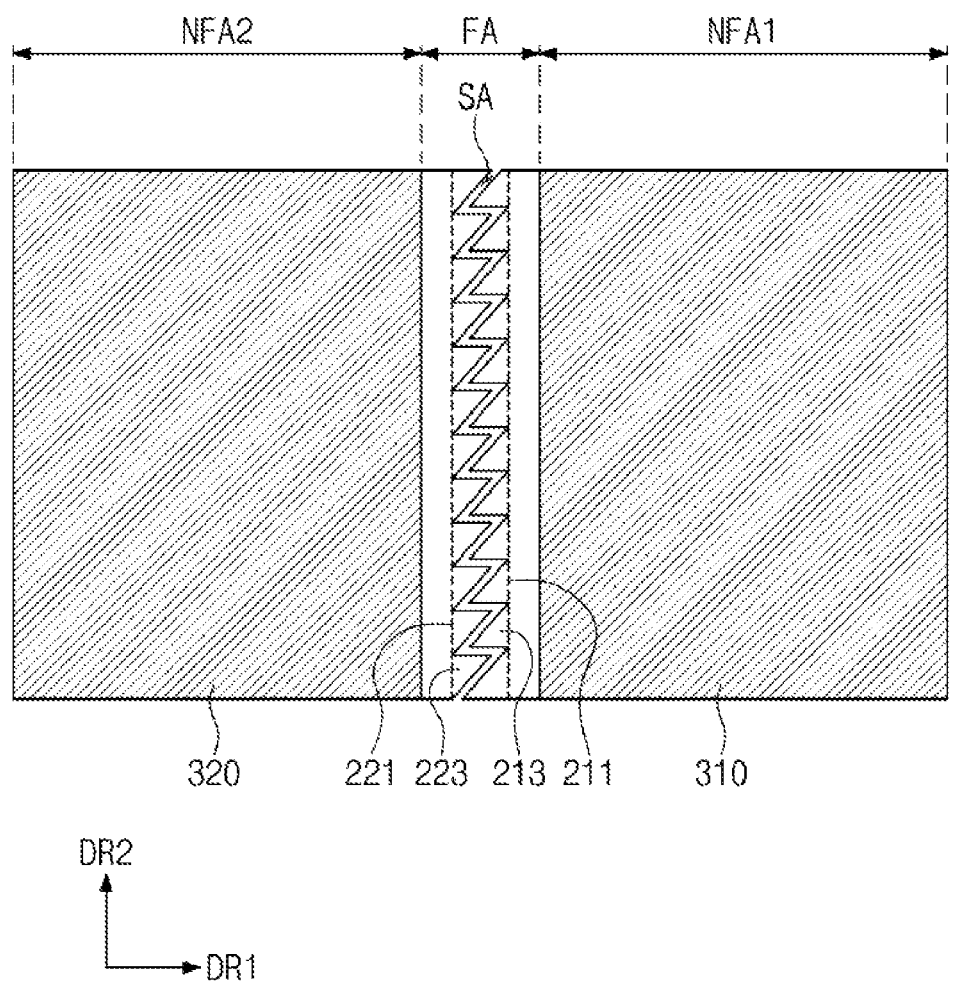
FIG. 5 is a plan view illustrating shapes of first and second support plates according to another embodiment of the inventive concept.
Figure 6:
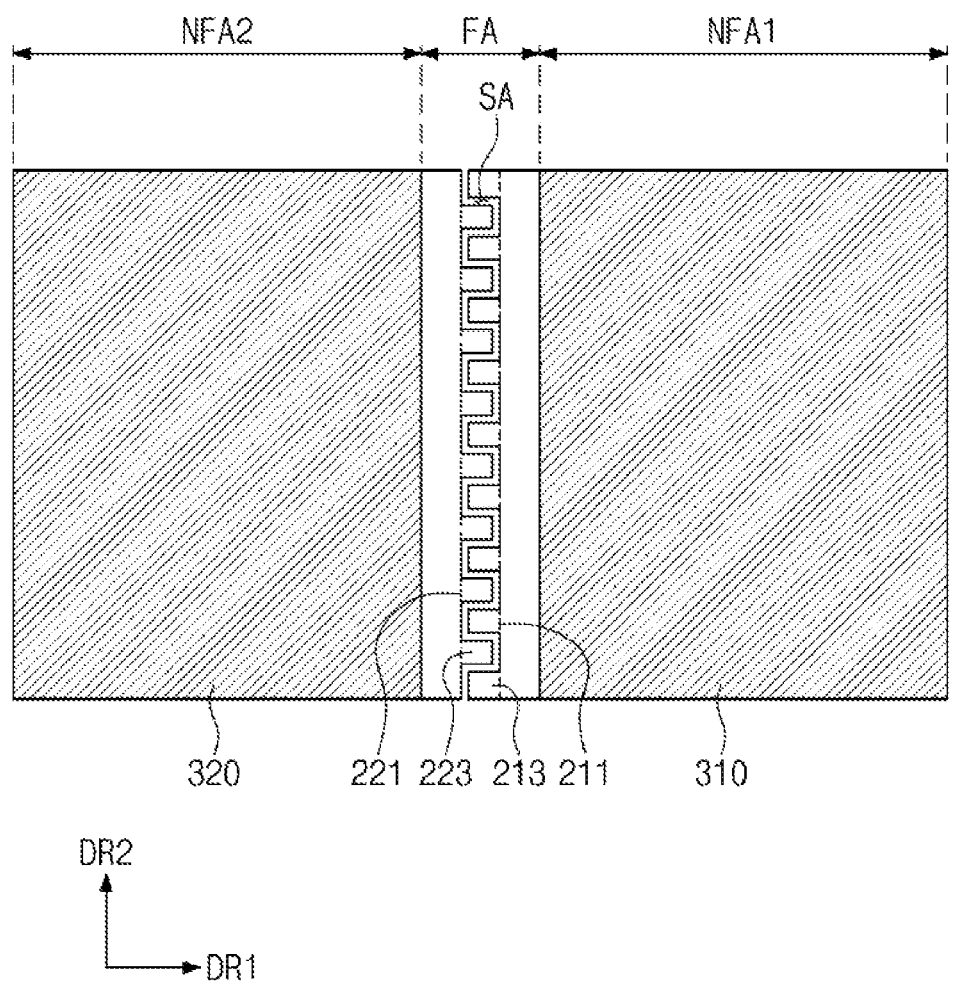
FIG. 6 is a plan view illustrating shapes of first and second support plates according to another embodiment of the inventive concept.

FIG. 5 is a plan view illustrating shapes of first and second support plates according to another embodiment of the inventive concept; and FIG. 6 is a plan view illustrating shapes of first and second support plates according to another embodiment of the inventive concept.

As illustrated in FIGS. 5 and 6, each of the first and second protrusions 213 and 223 may have a sawtooth shape or a rectangular shape. However, embodiments of the inventive concept are not limited to the shape of each of the first and second protrusions 213 and 223.

Referring again to FIGS. 3 and 4, a spaced space SA may be defined between the first support plate 210 and the second support plate 220.

Typically, fatigue may be accumulated in the folding area of a display module by the repetitive folding and unfolding operations of the display apparatus. Thus, the shape of the display module may be changed in the folding area. The shape change may include bending deformation such as looping or lumping at a position of the folding area of the display module, which corresponds to the folding axis. Particularly, an area of the folding area, which corresponds to a spaced space, may not be supported by the support plate. Thus, the bending deformation due to the looping may remarkably occur in the above-described area.

However, according to the inventive concept, the spaced space SA may not be formed in a straight-line shape, but may be formed in a zigzag shape by the first and second protrusions 213 and 223. Thus, a position at which bending deformation occurs may not be concentrated into an area corresponding to the folding axis FX, but may be dispersed to one side and the other side with respect to the folding axis FX. As described above, since the position at which the bending deformation occurs is dispersed, the overall bending deformation of the display module 100 may be reduced.

Figure 7:
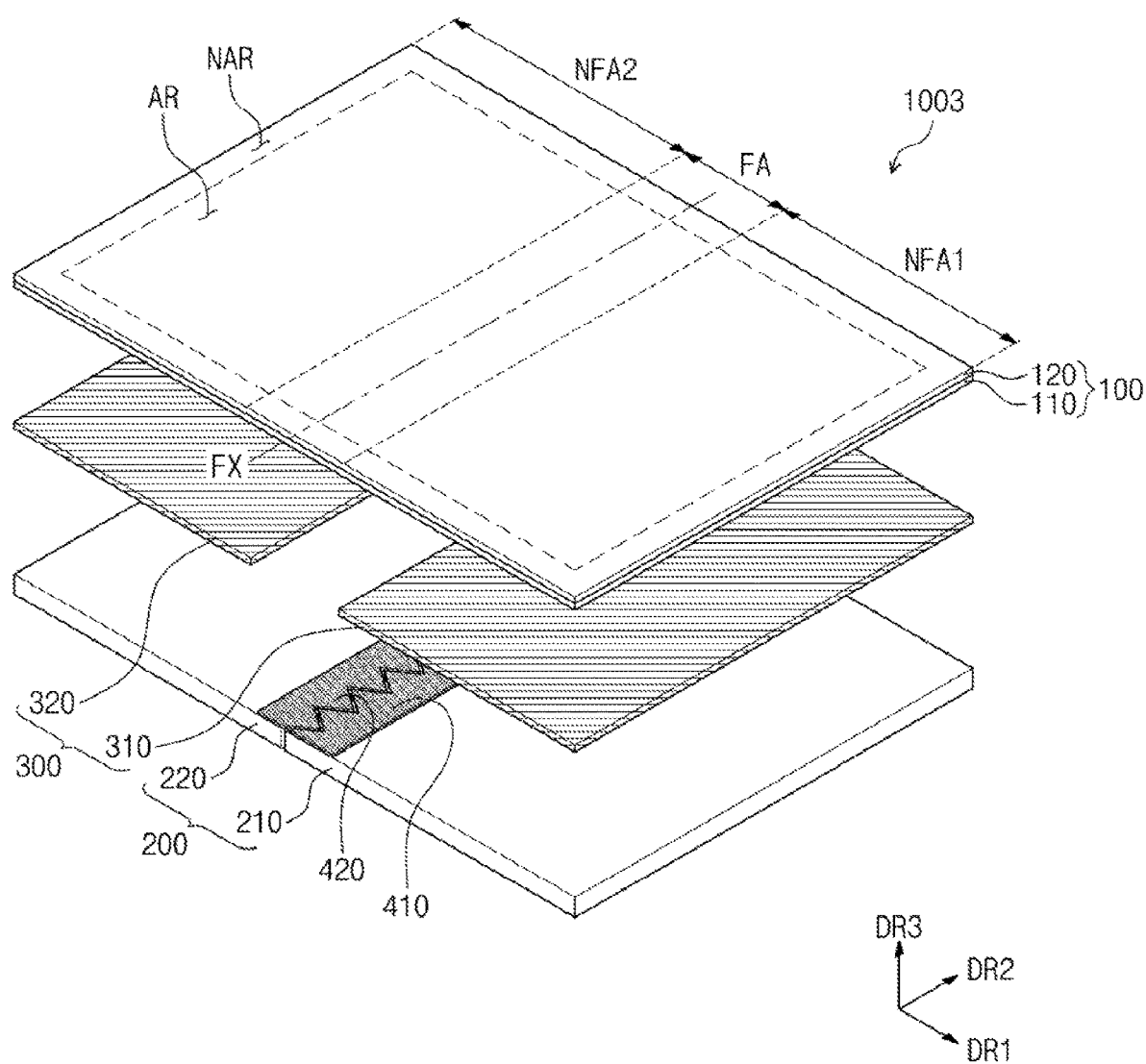
FIG. 7 is an exploded perspective view of a display apparatus according to another embodiment of the inventive concept.
Figure 8:
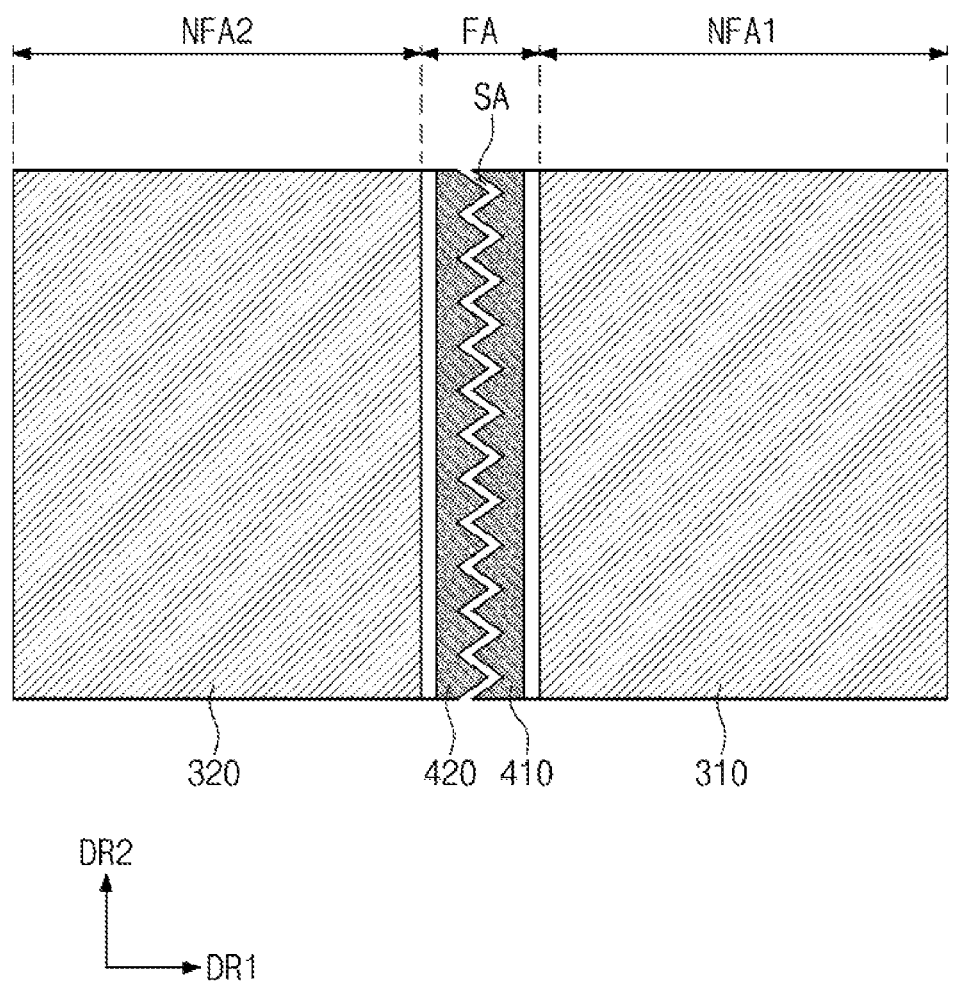
FIG. 8 is a plan view illustrating a position relationship of a support plate, an adhesion film, and first and second stepped layers of FIG. 7.
Figure 9:
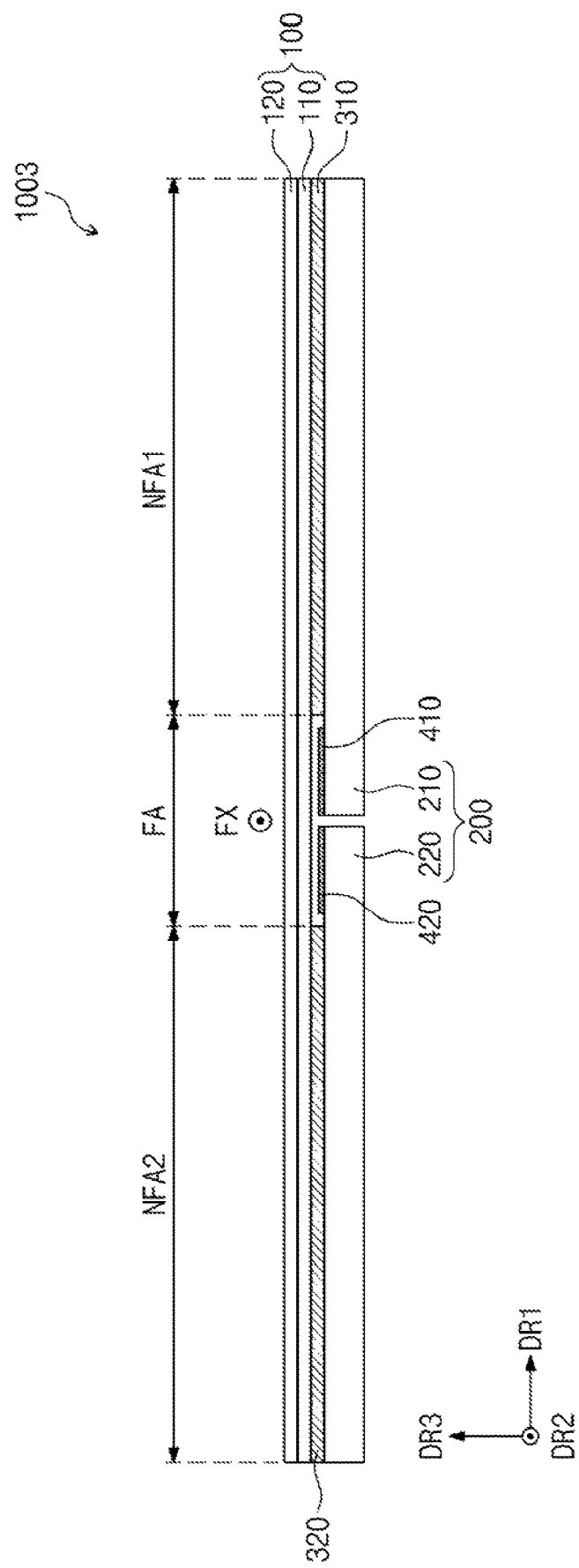
FIG. 9 is a cross-sectional view of the display apparatus of FIG. 7, taken along a line corresponding to the line I-I' of FIG. 1.
Figure 10:
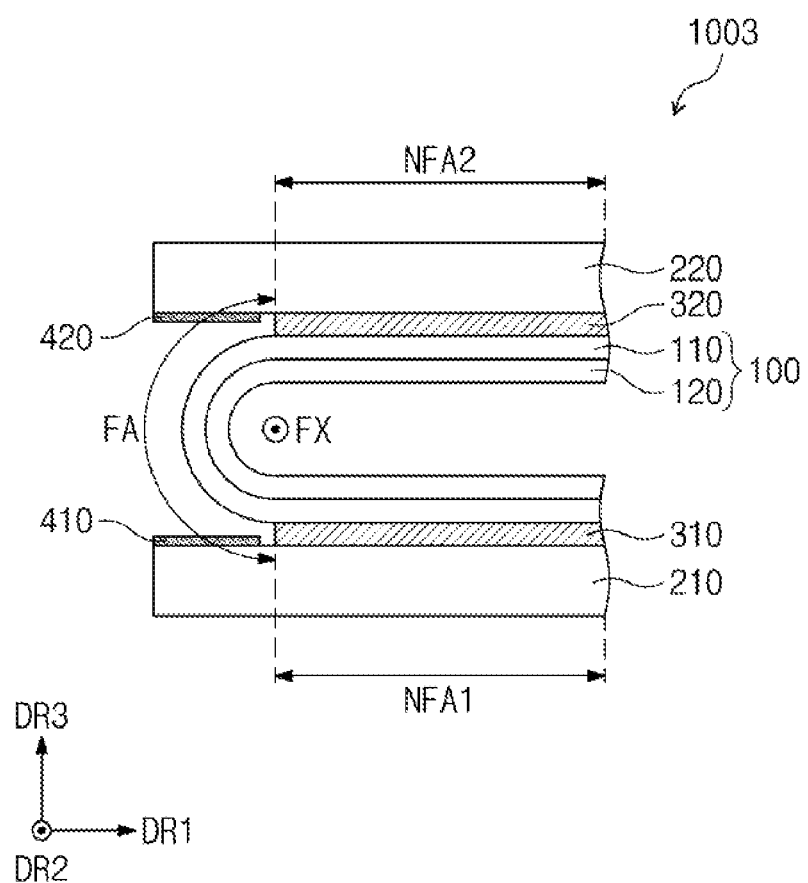
FIG. 10 is a cross-sectional view of the in-folded display apparatus of FIG. 7.

FIG. 7 is an exploded perspective view of a display apparatus according to another embodiment of the inventive concept; FIG. 8 is a plan view illustrating a position relationship of a support plate, an adhesion film, and first and second stepped layers of FIG. 7; FIG. 9 is a cross-sectional view of the display apparatus of FIG. 7, taken along a line corresponding to the line I-I' of FIG. 1; and FIG. 10 is a cross-sectional view of the in-folded display apparatus of FIG. 7.

For convenience of description, differences between this embodiment and the foregoing embodiment will be mainly described, and omitted descriptions may be derived from the foregoing embodiment. Also, the same reference symbols are given to same components, and duplicated descriptions with respect to the components will be omitted.

Referring to FIGS. 7 to 9, a display apparatus 1003 according to another embodiment of the inventive concept further includes first and second stepped layers 410 and 420.

The first stepped layer 410 is disposed between a first support plate 210 and a folding area FA of a display module 100. The second stepped layer 420 is disposed between a second support plate 220 and the folding area FA of the display module 100. The first and second stepped layers 410 and 420 are fixed to the first and second support plates 210 and 220, respectively.

The first and second stepped layers 410 and 420 may have adhesive tapes that are respectively attached to top surfaces of the first and second support plates 210 and 220. For example, the first and second stepped layers 410 and 420 may cover top surfaces of first and second protrusions 213 and 223, respectively. Here, the top surfaces of the first and second protrusions 213 and 223 may be defined as surfaces respectively facing first and second adhesion films 310 and 320.

In the non-folded state of the display module 100, the first and second stepped layers 410 and 420 support the folded area FA. As illustrated in FIG. 10, in the folded state of the display module 100, the first and second stepped layers 410 and 420 may be spaced apart from the folded area FA of the display module 100.

Figure 11:
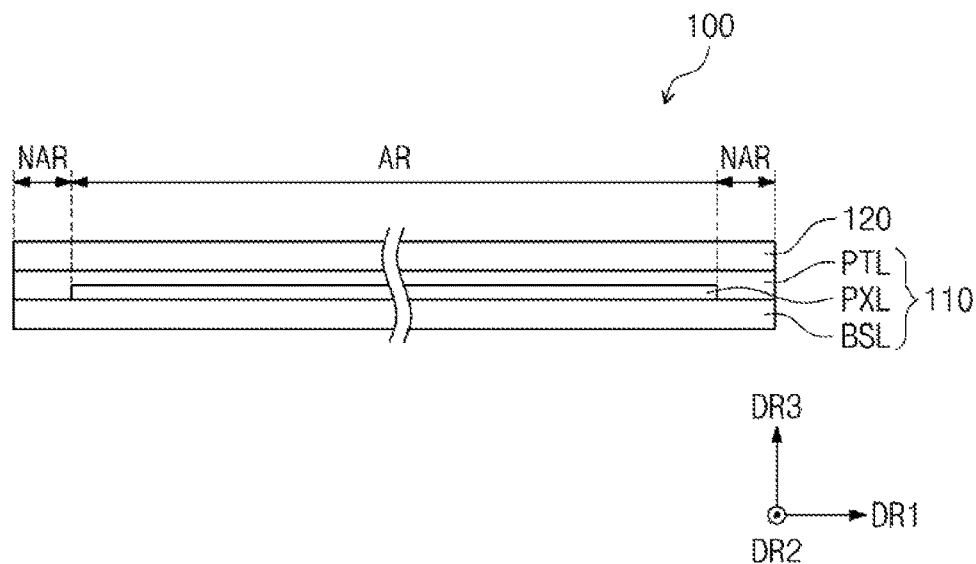
FIG. 11 is a cross-sectional view of a display module of a display apparatus according to an embodiment of the inventive concept.

FIG. 11 is a cross-sectional view of a display module of a display apparatus according to an embodiment of the inventive concept.

In an embodiment, referring to FIG. 11, the display panel 110 includes a base layer BSL, a pixel layer PXL, and a protection layer PTL. The base layer BSL defines a rear surface of the display module 100. The base layer BSL may be made of a flexible material.

The pixel layer PXL is disposed on the base layer BSL. The pixel layer PXL includes a plurality of pixels. The pixels receive an electrical signal to realize an image IM.

According to an embodiment of the inventive concept, a kind of the display panel 110 may be determined according to the configuration of the pixel layer PXL. The display panel 110 may be a liquid crystal display panel, an organic light emitting display panel, an electrophoretic display panel, or an electrowetting display panel, or may be any of various display panels capable of displaying images. In addition, the display panel 110 according to the inventive concept may include any of various embodiments, but is not limited to one embodiment.

Figure 12:
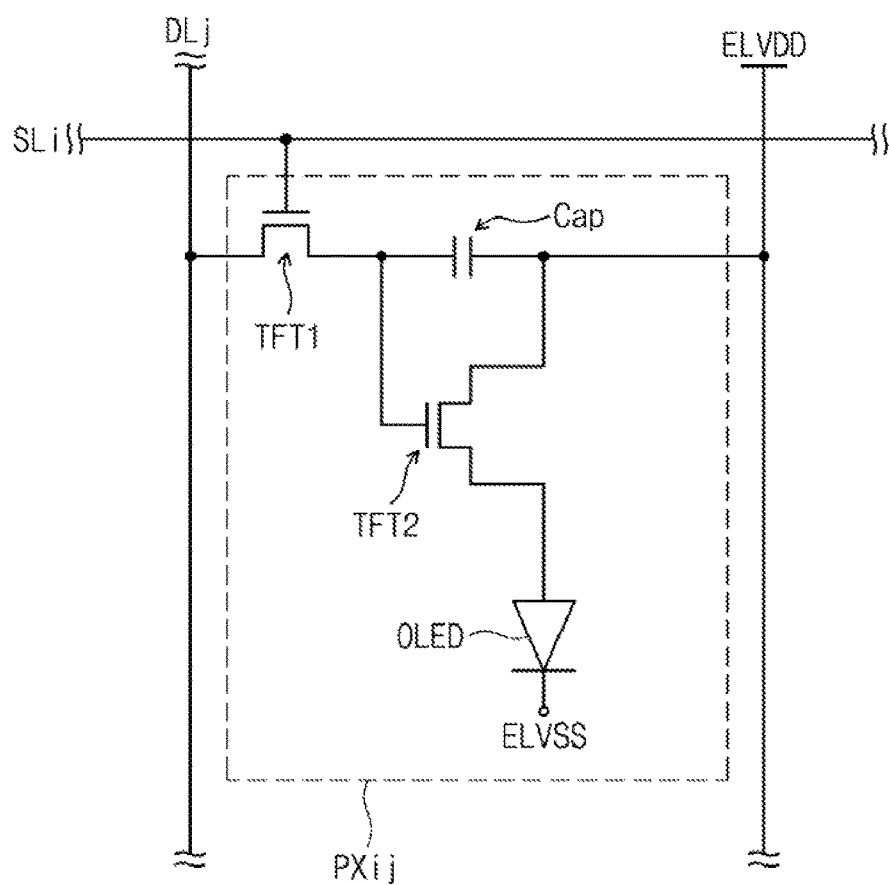
FIG. 12 is an equivalent circuit diagram illustrating one pixel of the display module of FIG. 11.

FIG. 12 is an equivalent circuit diagram illustrating one pixel of the display module of FIG. 11.

In an embodiment, referring to FIG. 12, the display panel 110 may include an organic light emitting display panel. Thus, one pixel PXij includes at least one thin film transistor, at least one capacitor, and at least one display device. In an embodiment, the pixel PXij includes a first thin film transistor TFT1, a second thin film transistor TFT2, one capacitor Cap, and an organic light emitting device OLED.

The first thin film transistor TFT1 includes a control electrode connected to an i-th scan line SLi, an input electrode connected to a j-th data line DLj, and an output electrode. The first thin film transistor TFT1 outputs a data signal applied to the j-th data line DLj in response to the scan signal applied to the i-th scan line SLi.

The capacitor Cap includes a first capacitor electrode connected to the first thin film transistor TFT1, and a second capacitor electrode receiving a first power voltage ELVDD. The capacitor Cap charges electrical charges by an amount corresponding to a difference between a voltage corresponding to the data signal received from the first thin film transistor TFT1 and the first power source voltage ELVDD.

The second thin film transistor TFT2 includes a control electrode connected to the output electrode of the first thin film transistor TFT1 and the first capacitor electrode of the capacitor Cap, an input electrode receiving the first power source voltage ELVDD, and an output electrode. The output electrode of the second thin film transistor TFT2 is connected to the organic light emitting device OLED.

The second thin film transistor TFT2 controls driving current flowing through the organic light emitting diode OLED to correspond to a charge amount stored in the capacitor Cap. A turn-on time of the second thin film transistor TFT2 is determined according to an amount of charges charged in the capacitor Cap. Substantially, the output electrode of the second thin film transistor TFT2 supplies a voltage having a level less than that of the first power source voltage ELVDD to the organic light emitting device OLED.

The organic light emitting device OLED includes a first electrode connected to the second thin film transistor TFT2, and a second electrode receiving a second power source voltage ELVSS. The organic light emitting device OLED may include a light emitting pattern disposed between the first and second electrodes.

The organic light emitting device OLED emits light during a turn-on period of the second thin film transistor TFT2. The light generated in the organic light emitting device OLED may have a color that is determined by a material for forming the light emitting pattern. For example, the light generated in the organic light emitting device OLED may have one of a red color, a green color, a blue color, and a white color.

The protection layer PTL is disposed on the pixel layer PXL to cover the pixel layer PXL. The protection layer PTL electrically insulates the pixel layer PXL from the input detection unit 120.

For example, the protection layer PTL may be an encapsulation layer that encapsulates the pixel layer PXL. In an embodiment, the protection layer PTL may include a plurality of laminated organic layers and/or inorganic layers.

In an embodiment, the protection layer PTL may be a planarization layer that planarizes a top surface of the pixel layer PXL. The protection layer PTL according to an embodiment may have any of various shapes, but is not limited to one embodiment.

Referring again to FIG. 11, the input detection unit 120 is disposed on the protection layer PTL. The active area AR of the input detection unit 120 may substantially overlap the area on which the pixel layer PXL is disposed.

The input detection unit 120 detects an external input provided to the active area AR of the display module 100.

The external input may be provided in various manners. FIG. 1 illustrates embodiments in which an external input inputted through a portion (for example, a finger) of a human body is detected. However, this is merely an example, and, thus, the external input provided to the input detection unit 120 is not limited to one manner. According to another embodiment of the inventive concept, the external input may be inputted in a manner such as an optical, touch, or magnetic manner.

Although not shown, the input detection unit 120 may include an input detection cell including a plurality of input detection sensors for detecting an external input, driving lines applying an electrical signal to the input detection cell or transmitting an electrical signal generated by the input detection cell to the outside, and pads. The pads may be connected to the display panel 110 or an external power supply device (not shown).

The input detection unit 120 may detect the external input in various manners. For example, the input detection unit 120 may be driven in a capacitance, resistive, or coordinate recognition manner.

Figure 13:
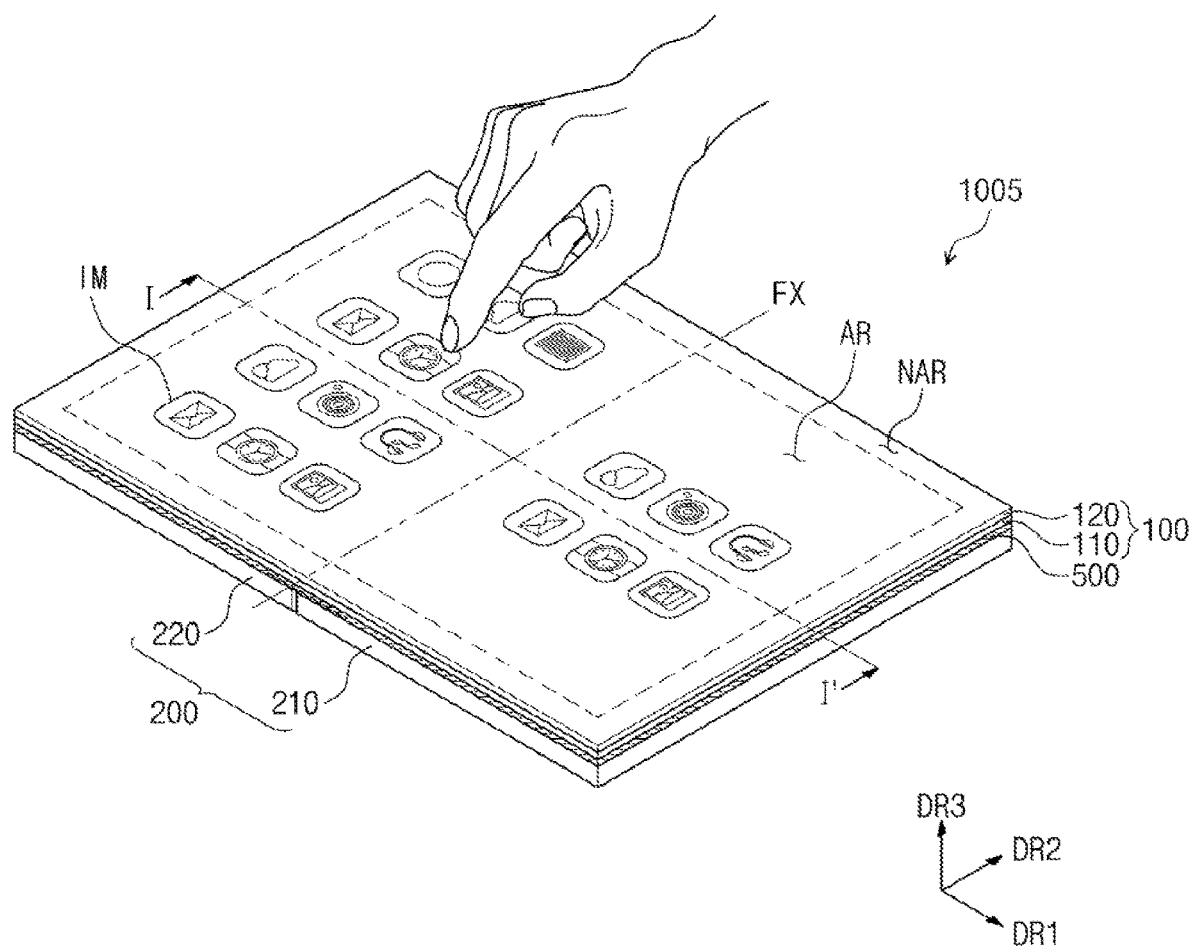
FIG. 13 is a perspective view of a display apparatus according to another embodiment of the inventive concept.
Figure 14:
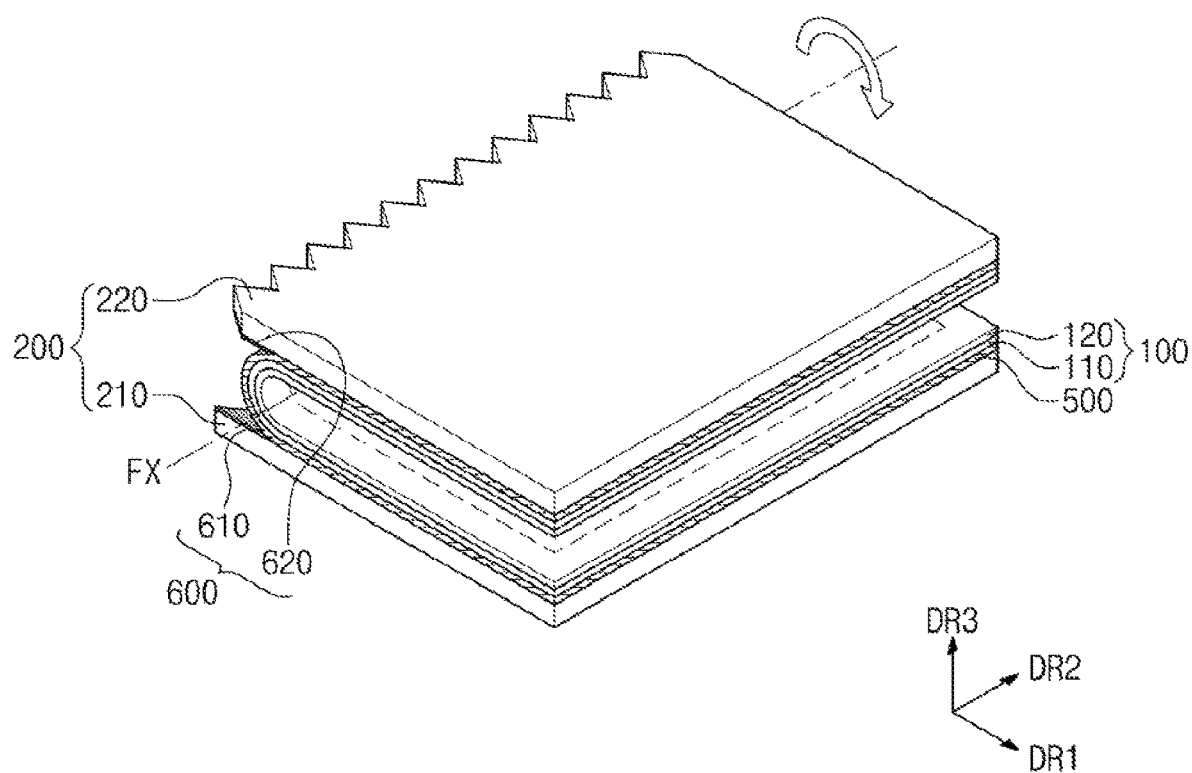
FIG. 14 is a view illustrating a state in which the display apparatus of FIG. 13 is in-folded.

FIG. 13 is a perspective view of a display apparatus according to another embodiment of the inventive concept; FIG. 14 is a view illustrating a state in which the display apparatus of FIG. 13 is in-folded; and FIG. 15 is an exploded perspective view of the display apparatus of FIG. 13.

For convenience of description, differences between this embodiment and the foregoing embodiments will be mainly described, and omitted descriptions may be derived from the foregoing embodiments. Also, the same reference symbols are given to the same components, and duplicated descriptions with respect to the components will be omitted.

Figure 15:
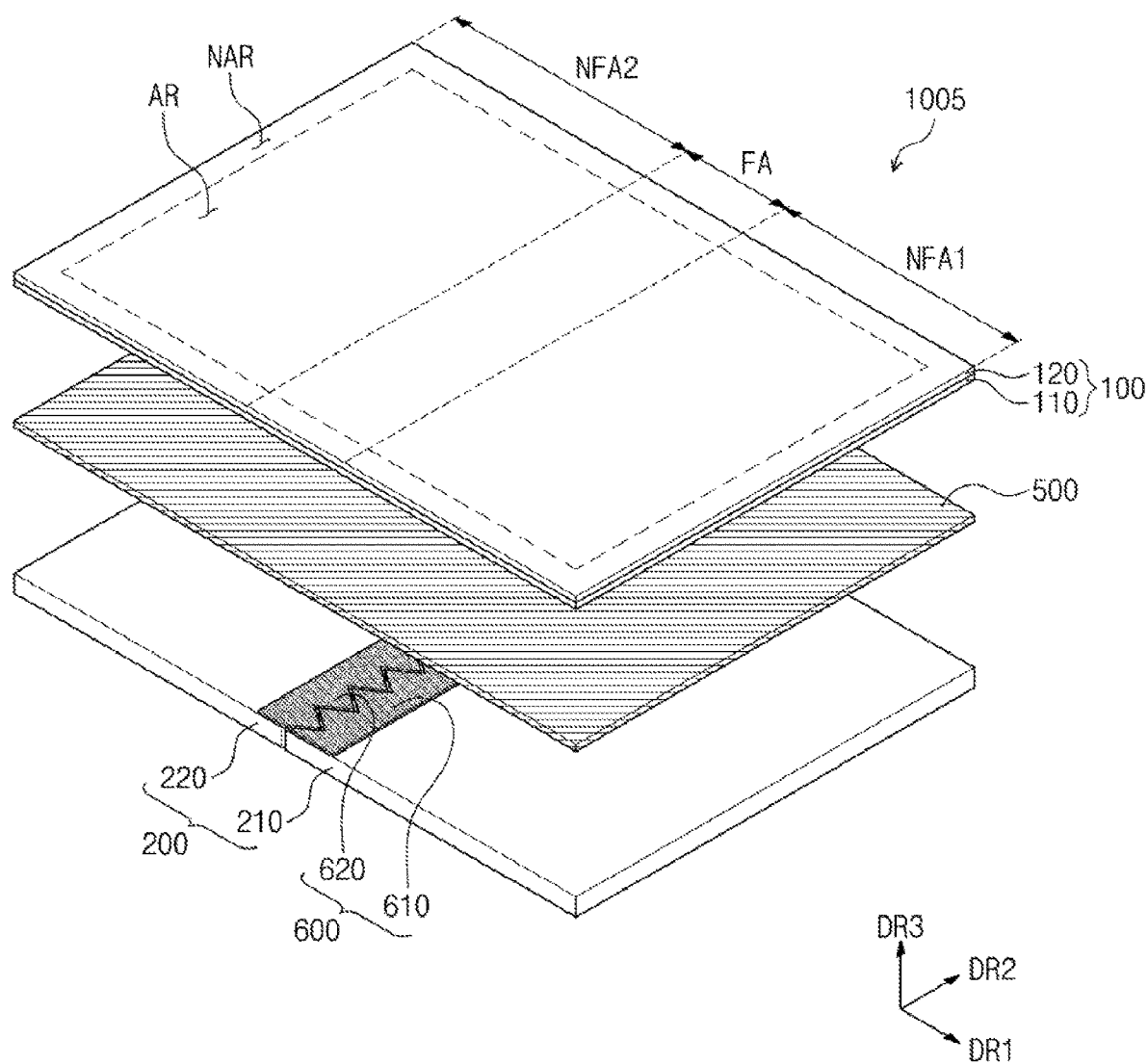
FIG. 15 is an exploded perspective view of the display apparatus of FIG. 13.

Referring to FIGS. 13 and 15, a display apparatus 1005 according to another embodiment of the inventive concept includes a display panel 100, a support plate 200, an adhesion film 500, and a non-adhesion film 600.

The adhesion film 500 is disposed between the display module 100 and the support plate 200. The adhesion film 500 bonds the display module 100 and the support plate 200 to each other on non-folding areas NFA1 and NFA2. The adhesion film 500 may have an integrated shape. The adhesion film 500 according to an embodiment of the inventive concept may include a thermosetting resin or a photocurable resin.

The non-adhesion film 600 is disposed between the adhesion film 500 and the support plate 200. The non-adhesion film 600 may reduce bonding force between the adhesion film 500 and the support plate 200. In an embodiment, for example, the non-adhesion film 600 may include fluorine or titanium. The non-adhesion film 600 is disposed to overlap the folding area FA.

Figure 16:
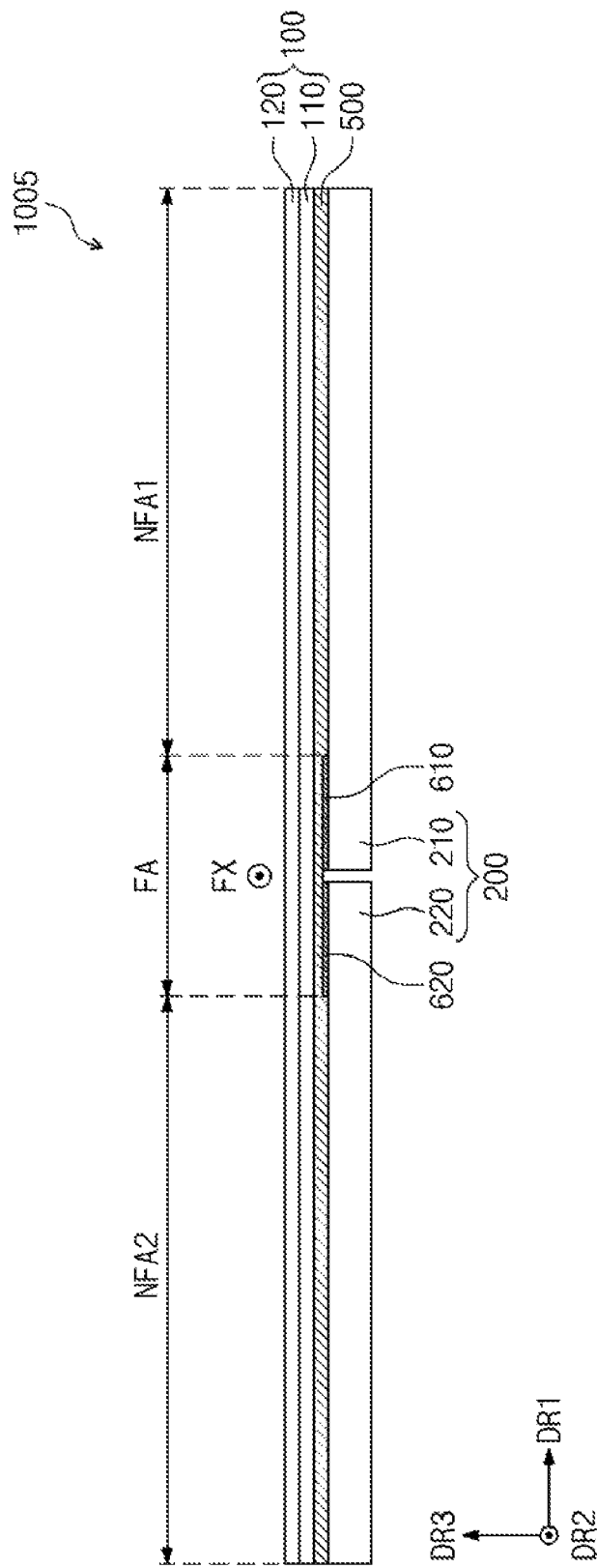
FIG. 16 is a cross-sectional view of the display apparatus of FIG. 13, taken along the line I-I' of FIG. 13.
Figure 17:
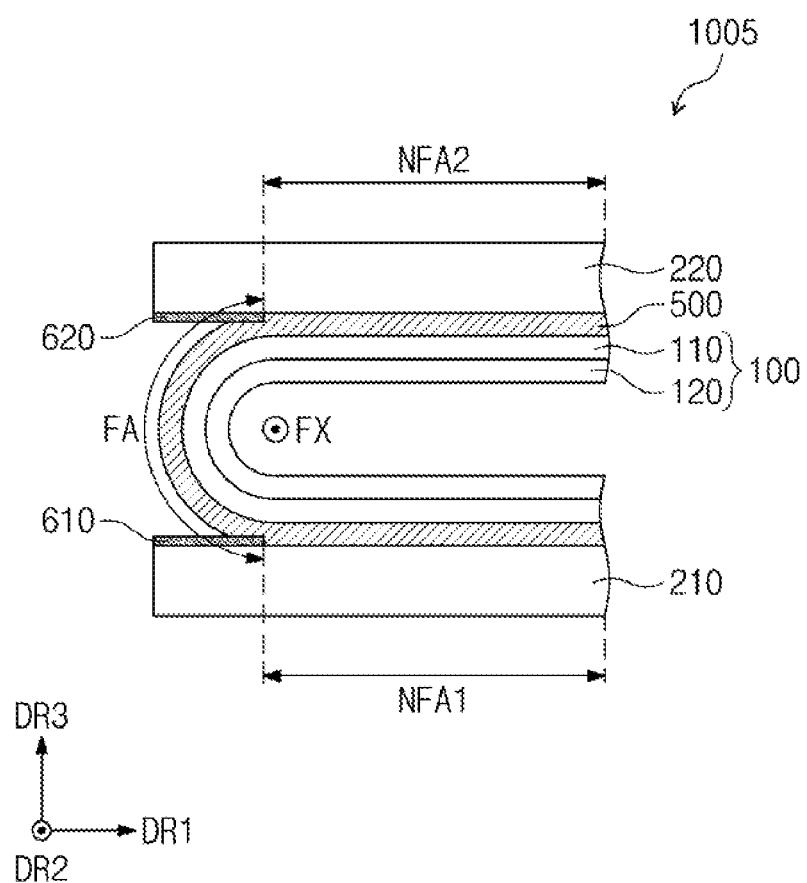
FIG. 17 is a cross-sectional view of the in-folded display apparatus of FIG. 13.

FIG. 16 is a cross-sectional view of the display apparatus of FIG. 13, taken along the line I-I' of FIG. 13; and FIG. 17 is a cross-sectional view of the in-folded display apparatus of FIG. 13.

Referring to FIGS. 14 to 17, the non-adhesion film 600 may include a first non-adhesion film 610 and a second non-adhesion film 620. The first non-adhesion film 610 is disposed between the adhesion film 500 and the first support plate 210, and the second non-adhesion film is disposed between the adhesion film 500 and the second support plate 220.

According to an embodiment, the first and second non-adhesion films 610 and 620 are disposed on top surfaces of the first and second support plates 210 and 220, respectively. Here, each of the top surfaces of the first and second support plates 210 and 220 may be a surface facing the adhesion film 500.

The first and second non-adhesion films 610 and 620 may be coupled to the top surfaces of the first and second support plates 210 and 220, respectively. According to an embodiment, the first and second non-adhesion films 610 and 620 have shapes applied to the top surfaces of the first and second support plates 210 and 220, respectively. However, the embodiment of the inventive concept is not limited thereto. For example, the first and second non-adhesion films 610 and 620 may be respectively coupled to the top surfaces of the first and second support plates 210 and 220 in the form of a film or sheet. In an embodiment, the first and second non-adhesion films 610 and 620 may cover the top surfaces of the first and second protrusions (see reference numerals 213 and 223 of FIG. 4). Here, each of the top surfaces of the first and second protrusions 213 and 223 may be defined as a surface facing the adhesion film 500.

In an embodiment, each of the first and second non-adhesion films 610 and 620 may include fluorine or titanium. In an embodiment, for example, each of the first and second non-adhesion films 610 and 620 may be a coating agent due to anti-finger coating. In an embodiment, each of the first and second non-adhesion films 610 and 620 may have a thickness of about 1 µm or less.

The first and second non-adhesion films 610 and 620 may reduce bonding force between the adhesion film 500 and the support plate 200. Thus, the adhesion film 500 and the first support plate 210 are not bonded to each other on the folding area FA on which the first non-adhesion film 610 is disposed, and the adhesion film 500 and the second support plate 220 are not bonded to each other on the folding area FA on which the second non-adhesion film 620 is disposed.

When the display module 100 is folded, a portion of the first support plate 210 overlapping the folding area FA is spaced apart from the adhesion film 500 by the first non-adhesion film 610, and a portion of the second support plate 220 overlapping the folding area FA is spaced apart from the adhesion film 500 by the second non-adhesion film 620. Thus, even though the display module 100 is folded, the first and second support plate 210 and 220 having relatively large rigidity may not be folded, and stress applied to the folding area FA of the display module 100 may be reduced.

Typically, fatigue may be accumulated in the display module that overlaps the folding area by the repetitive folding and unfolding operations of the display apparatus. Thus, the shape of the display module, which corresponds to the folding area, may be changed.

In the present embodiment, when the adhesion film 500 has the integrated shape and is disposed on the folding area FA, the folding area FA of the display module 100 may be supported by the adhesion film 500. Thus, according to the present embodiment, a phenomenon in which the display module 100 is changed in shape may be reduced.

Although not shown, the first and second non-adhesion films 610 and 620 may be bonded to a bottom surface of the adhesion film 500. Here, the bottom surface of the adhesion film 500 may be a surface facing the support plate 200. The first and second non-adhesion films 610 and 620 may be bonded to the top surfaces of the first and second support plates 210 and 220, respectively.

The first and second non-adhesion films 610 and 620 may be applied to the bottom surface of the adhesion film 500. Thus, as the display module 100 is folded, a portion of the adhesion film 500 overlapping the folding area FA may be spaced apart from each of the first and second support plates 210 and 220. Thus, even though the display module 100 is folded, the first and second support plate 210 and 220 having relatively large rigidity may not be folded, and thus, the stress applied to the folding area FA of the display module 100 may be reduced.

According to embodiments of the inventive concept, the durability and the display quality of the display apparatus may be improved.

It will be apparent to those skilled in the art that various modifications and variations can be made in the inventive concept. Thus, it is intended that the present disclosure covers the modifications and variations of this invention. Thus, the scope of the present invention shall not be restricted or limited by the foregoing description.

What is claimed is:

1. A display apparatus comprising:
   a display module in which a folding area foldable with respect to a virtual folding axis on a plane and a plurality of non-folding areas adjacent to both sides of the folding area are defined and which is configured to display an image; and
   a support plate arranged below the display module, wherein the support plate comprises:
   a first support plate on a first non-folding area of the plurality of non-folding areas; and
   a second support plate spaced apart from the first support plate on a second non-folding area of the plurality of non-folding areas,
   wherein a spaced space between the first support plate and the second support plate is provided in the folding area with a zigzag shape.

2. The display apparatus of claim 1, wherein a first side surface of the first support plate faces a second side surface of the second support plate, and
   the first support plate comprises a plurality of first protrusions extended from the first side surface toward the second side surface, and the second support plate comprises a plurality of second protrusions extended from the second side surface toward the first side surface.

3. The display apparatus of claim 2, wherein, the first and second protrusions are alternately arranged with respect to each other,
   the spaced space is formed in the zigzag shape by an arrangement of the first and second protrusions.

4. The display apparatus of claim 2, further comprising:
   a first adhesion film configured to fix the first support plate to the first non-folding area; and
   a second adhesion film configured to fix the second support plate to the second non-folding area.

5. The display apparatus of claim 4, further comprising:
   a first stepped layer between the first protrusions and the first adhesion film; and
   a second stepped layer between the second protrusions and the second adhesion film.

6. The display apparatus of claim 5, wherein the first and second stepped layers are fixed to the first and second support plates, respectively.

7. The display apparatus of claim 1, wherein the support plate has rigidity greater than that of the display module.

8. The display apparatus of claim 1, further comprising an adhesion film between the display module and the support plate,
   wherein the adhesion film overlaps with the spaced space.

9. The display apparatus of claim 8, further comprising a non-adhesion film between the adhesion film and the support plate on the folding area.

10. The display apparatus of claim 9, wherein the non-adhesion film comprises fluorine or titanium.

11. The display apparatus of claim 10, wherein the non-adhesion film comprises:
    a first non-adhesion film between the first support plate and the adhesion film on the folding area; and
    a second non-adhesion film between the second support plate and the adhesion film on the folding area.

12. The display apparatus of claim 11, wherein the first and second non-adhesion films are fixed to the first and second support plates, respectively.

* * * * *